United States Patent
Mehra

(10) Patent No.: US 11,675,410 B2
(45) Date of Patent: Jun. 13, 2023

(54) PREDICTING PROCESSOR POWER DISTURBANCES BY MONITORING PERFORMANCE CHARACTERISTICS

(71) Applicant: ADVANCED MICRO DEVICES, INC., Santa Clara, CA (US)

(72) Inventor: Amitabh Mehra, Fort Collins, CO (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 15/949,662

(22) Filed: Apr. 10, 2018

(65) Prior Publication Data
US 2019/0310698 A1 Oct. 10, 2019

(51) Int. Cl.
G06F 1/32 (2019.01)
G06F 1/3206 (2019.01)
G06F 1/324 (2019.01)
G06F 1/329 (2019.01)

(52) U.S. Cl.
CPC ............ *G06F 1/3206* (2013.01); *G06F 1/324* (2013.01); *G06F 1/329* (2013.01)

(58) Field of Classification Search
CPC ......... G06F 1/3206; G06F 1/324; G06F 1/329
See application file for complete search history.

(56) References Cited

U.S. PATENT DOCUMENTS

| | | | |
|---|---|---|---|
| 8,181,049 B2 * | 5/2012 | Rozen | G06F 1/30 713/322 |
| 9,092,210 B2 * | 7/2015 | Rotem | G06F 1/28 |
| 10,387,234 B2 * | 8/2019 | Paterson | |
| 2014/0337853 A1 * | 11/2014 | Kim | G06F 9/5094 718/104 |
| 2015/0378412 A1 * | 12/2015 | Suryanarayanan | G06F 1/3206 713/340 |
| 2017/0329391 A1 * | 11/2017 | Jaffari | G06F 1/08 |

OTHER PUBLICATIONS

Merriam-Webster dictionary, definition of system, retrieved from the internet at <https://www.merriam-webster.com/dictionary/system>.*

* cited by examiner

*Primary Examiner* — Stefan Stoynov

(57) ABSTRACT

A monitoring system predicts voltage droops at a processor by monitoring one or more performance characteristics of the processor, selecting a response policy based on the prediction, and adjusting a parameter of the processor. Multiple predictions of voltage droop conditions at different locations of the processor are made simultaneously, with the processor generating one or more responses and resulting in adjusting one or more parameters of the processor. By predicting voltage droop conditions before they occur, the deleterious effects of such droop conditions can be minimized or avoided.

17 Claims, 5 Drawing Sheets

PREDICTING PROCESSOR POWER DISTURBANCES BY MONITORING PERFORMANCE CHARACTERISTICS

BACKGROUND

Description of the Related Art

Modern processor designs continue to demand more power per unit area due to increased circuit density as compared to past designs. These trends place a heavier burden on the power supply powering the processor. As a result, the processor has less tolerance for voltage changes, or "droops", due to fluctuating loads. The voltage droops can cause disruptions to the processor when executing instructions, including a reduced rate of instruction execution, logic modules failing to operate, and corrupted data.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

FIGS. 1-5 illustrate techniques for predicting voltage droops at a processor by monitoring one or more performance characteristics of the processor, selecting a response policy based on the prediction, and adjusting a parameter of the processor. Examples of such performance characteristics include, but are not limited to, a rate at which instructions are executed at a processor core, a number of recent operations of a given type (e.g., read/write operations), cache hit rate, instruction pointer activity, and the like. In some embodiments, multiple predictions of voltage droop conditions at different locations of the processor are made simultaneously, with the processor generating one or more responses and resulting in adjusting one or more parameters of the processor. By predicting voltage droop conditions before they occur, the deleterious effects of such droop conditions are minimized or avoided altogether.

To illustrate, in some embodiments the processor predicts future droop events by monitoring the performance characteristics of the processor using a monitoring module. Next, a predictor module compares the performance characteristics against a previously-stored history of voltage droop conditions to determine a likelihood of a future droop event. When the predictor module determines that a droop event is likely, a policy selector module selects a response to prevent or mitigate the droop event, with the response adjusting one or more parameters of the processor. In some embodiments, the adjusted parameters include reducing the number of instructions being executed by the processor, reducing the frequency of a system clock in a clock-stretching procedure, and commands to reduce the rate of instruction execution.

Figure 1:
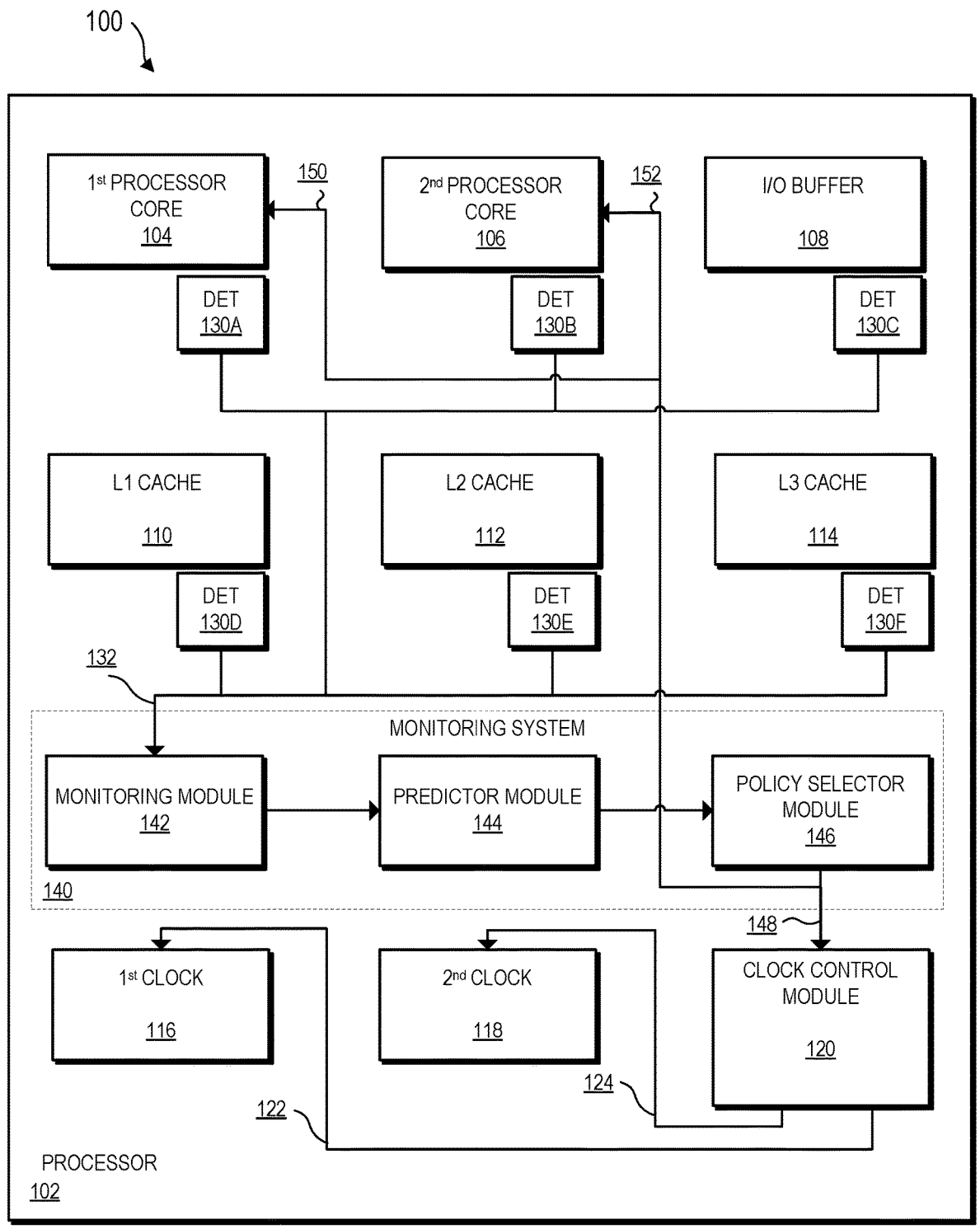
FIG. 1 is a block diagram of a processor having a monitoring system to predict voltage droops at the processor in accordance with some embodiments.

FIG. 1 is a block diagram of a processing system 100 including a processor 102 having a monitoring system 140 to predict voltage droops at the processor 102 in accordance with some embodiments. In the illustrated example of FIG. 1, processor 102 includes multiple internal modules including, but not limited to, a first processor core 104, a second processor core 106, an input/output (I/O) buffer 108, a level-one (L1) cache (memory) 110, a L2 cache 112, a L3 cache 114, a first reference clock 116, a second reference clock 118, a clock control module 120, and a plurality of detectors 130A-130F. The processor 102 also includes the monitoring system 140 that includes a monitoring module 142 that receives performance characteristics from each of the detectors 130A-130F, stores the data collected, and forwards the data to a predictor module 144. When the predictor module 144 determines that a droop event is likely, the predictor module 144 sends instructions to a policy selector module 146. The policy selector module 146 chooses one or more response policies. The processor 102 also includes control lines from the clock control module 120 to each reference clock 116, 118, with a first control line 122 to the first clock 116 and a second control line 124 to the second clock 118. Commands from the policy selector module 146 are sent to the clock control module 120 via a third control line 148, to the first core 104 via a fourth control line 150, and to the second core 106 via a fifth control line 152. In some embodiments, each of the modules of the processor 102 are formed on the same semiconductor die to form at least a portion of the processor 102.

The processor 102 is generally configured to execute sets of instructions organized in the form of computer programs in order to carry out tasks on behalf of an electronic device. Accordingly, the processor 102 may be used in any of a variety of electronic devices, such as a desktop or laptop computer, server, smartphone, tablet, game console, and the like. The first and second cores 104, 106 execute instructions of the processor, operate independently of each other, have their own clocks, and have the ability to execute different processes, instructions, and I/O signals. The I/O buffer 108 controls input and output signals to and from the modules within the processor 102, as well as signals from outside the processor 102.

The L1, L2, and L3 cache 110, 112, 114 are each memory devices generally configured to store data, and therefore may be random access memory (RAM) memory modules, non-volatile memory devices (e.g., flash memory), and the like. The L1, L2, and L3 cache 110, 112, 114 stores data retrieved from other system memory for later retrieval by the cores 104, 106, and form a memory hierarchy for the processing system 100. In addition, the memory hierarchy of the processor 102 may include other memory modules, such as additional caches not illustrated at FIG. 1.

The first and second reference clocks 116, 118 provide a stable system synchronization signal to the corresponding cores 104, 106 and other modules. The clock control module 120 controls the frequency of the clocks 116, 118. The clocks 116, 118 operate at the same or different frequencies, and the frequency of each clock signal is reduced ("clock stretching") or increased as directed by the clock control module 120 and based on operating conditions at the processor 102.

The detectors 130A-130F monitor performance characteristics of modules within the processor 102. The performance characteristics being monitored include, but are not limited to, voltage levels at a point in the processor 102, a list of recent instructions executed by the processor, recent read/write operations, the current or past cache hit rate, instruction pointer activity, and the like. In this manner, the performance characteristics, as delivered to the monitoring module 142, are measured and quantified in real time, and this data is used by the monitoring system 140 to predict future droop events as likely to occur.

In some embodiments, the clock control module 120 receives commands from the policy selector module 146 and sends signals to the clocks 116, 118 as instructed to begin adjusting parameters, including, but not limited to clock stretching actions whenever a droop event is predicted to occur. The clock control module 120 is a module generally configured to manage the reference clocks 116, 118 of the processor 102 by changing the output frequency of the clocks 116, 118 by using clock stretching techniques. When clock stretching occurs, the clock 116, 118 frequencies are reduced, the power usage of all modules in the processor 102 are also reduced, and the cores 104, 106 executes instructions at a slower rate, further reducing power usage and alleviating any possible droop event or prediction that generated the response. In this manner, the droop event is mitigated to minimize adverse effects to the processor 102 as described earlier.

In operation, the predictor module 144 receives the data from the monitoring module 142 and compares the history of recent performance of the processor 102 to a database of predetermined metrics to determine whether a future droop event is likely to take place. In some embodiments, the response policy includes, but is not limited to, one or more commands to adjust the parameters of the first and second cores 104, 106, reducing the number of instructions executed, commands to the clock control module 120 to begin clock stretching instructions, commands to the first and second cores 104, 106 to not execute instructions for a delay period while maintaining a constant reference clock frequency, and the like.

Figure 2:
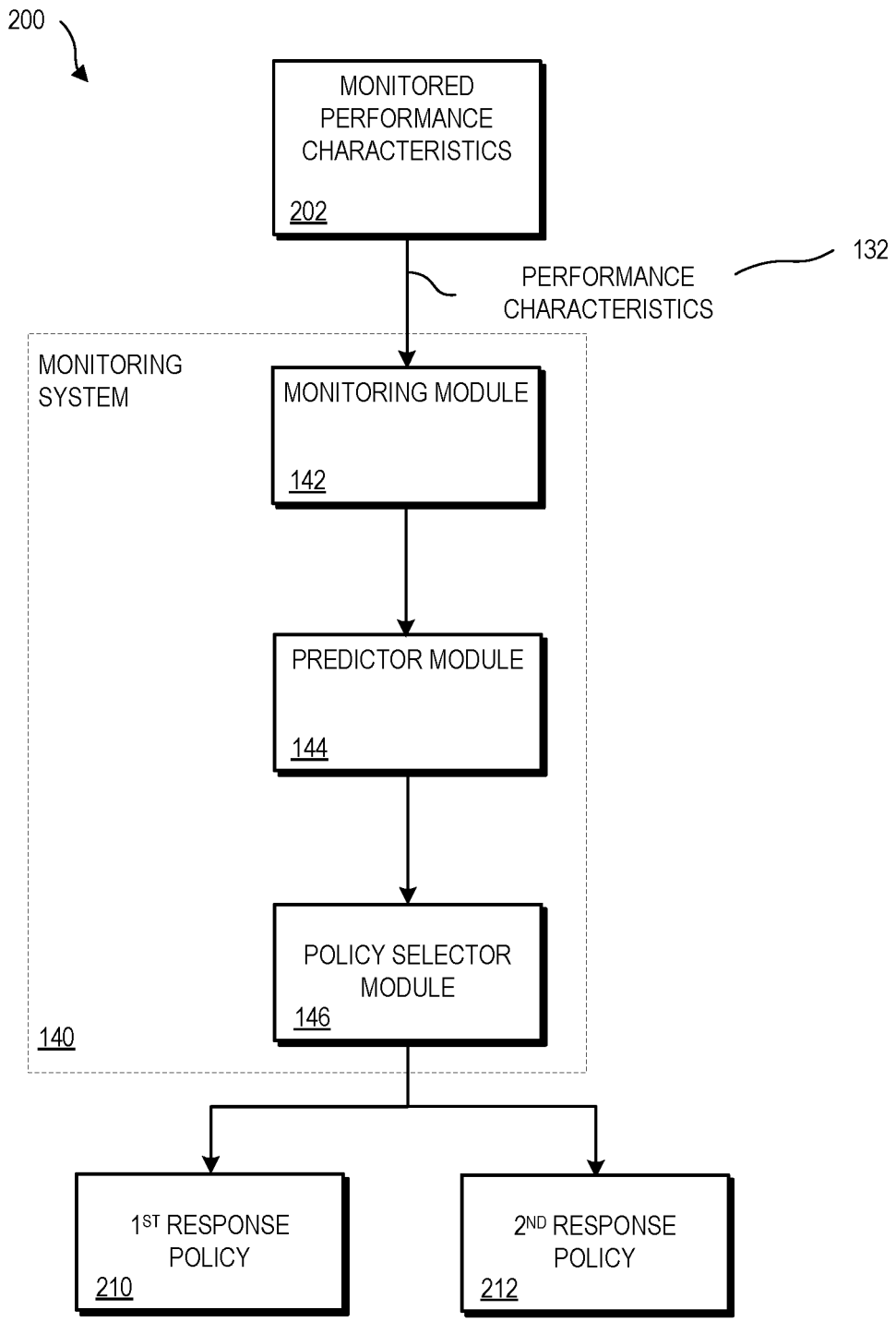
FIG. 2 is a block diagram of the monitoring system of FIG. 1 employing a monitoring module, a predictor module, and a policy selector module to predict droop events at the processor in accordance with some embodiments.

FIG. 2 is a block diagram 200 of the monitoring system 140 of FIG. 1 employing a monitoring module 142, a predictor module 144, and a policy selector module 146 to predict droop events at the processor 102 in accordance with some embodiments. The monitoring system 140 monitors the performance of the processor 102 to predict a future voltage droop event that could harm current and future operations if left unchecked. With a decision by the monitoring system 140 that a droop event is likely to occur in the future, the monitoring system 140 issues commands as part of a response policy to modules within the processor 102 in an effort to mitigate the effects of any droop events that do in fact actually occur. Furthermore, the response policy has an additional benefit of minimizing or eliminating effects of the droop event by reducing the workload of the processor 102 in response to the prediction, thus preventing or minimizing adverse effects on processor 102 operations.

The monitoring module 142 receives data in the form of performance characteristics 132 from one or more detectors 130A-130F of FIG. 1 and stores this data into a database for further processing by the monitoring system 140. In some embodiments, the performance characteristics 132 includes voltage levels at one or more points on the processor 102, a list of instructions for the first and second cores 104, 106 to execute, and a record of the recent cache hit rate. This list is not limiting, and in other embodiments, other performance characteristics can be monitored to predict droop events. These performance characteristics are indicative of the overall workload of the processor 102 during current and recent operations. Droop events often appear more frequently when the processor 102 experiences high levels of activity. Data derived from the performance characteristics 132 are then sent to the predictor module 206. The predictor module 144 determines whether a droop event is forthcoming based on the performance characteristics 132 data. Once the predictor module 144 determines that a droop event is likely, the predictor module 144 generates a signal to the policy selector module 146 to generate a first response policy 210. In some embodiments, the policy selector module 146 generates multiple response policies 210, 212 that are targeted to different modules of the processor 102 such as the first core 104 or the L1 cache 110. The policy selector module 146 chooses which of several response policies 210, 212 to generate. In some embodiments, the policies 210, 212 are commands to various modules of the processor 102 in an effort to avoid the negative effects of a droop event. These commands include reducing the execution rate of the first and second cores 104, 106, begin clock-stretching operations, and the like. Other embodiments are possible, including additional commands to modules of the processor 102 in an effort to reduce power usage and backup data.

In operation, the monitoring system 140 monitors performance characteristics of the processor 102 at one or more points of the processor using the detectors 130A-130F of FIG. 1. The monitoring system 140 ascertains how active the processor 102 is, and how many loads, memory accesses, and the like have occurred recently in an effort to predict an impending droop event. The monitoring system 140 monitors the loading of the processor 102 over a long interval and maintains a record of the loading of the processor 102 over time. There is a higher likelihood of a droop event occurring when the processor 102 transitions from a low-activity state to a high-activity state. The monitoring system 140 also monitors the current and past instruction pointer counter and cache hit rate to ascertain the immediate and near-future workload of the processor 102. When the predictor module 144 determines that the combination of workload or voltage levels indicate that a droop event is impending, the predictor module 144 makes a determination that a voltage droop condition is about to occur and sends a signal to the policy selector module 146 to begin executing a first response policy 210, or a second response policy 212, in an effort to mitigate the effects of a possible droop condition. In some embodiments, the execution of the first or second response policy 210, 212 also has the effect of lowering the workload of the processor 102, thus alleviating the operation conditions of the processor 102 and minimizing or eliminating the droop condition from actually occurring.

Figure 3:
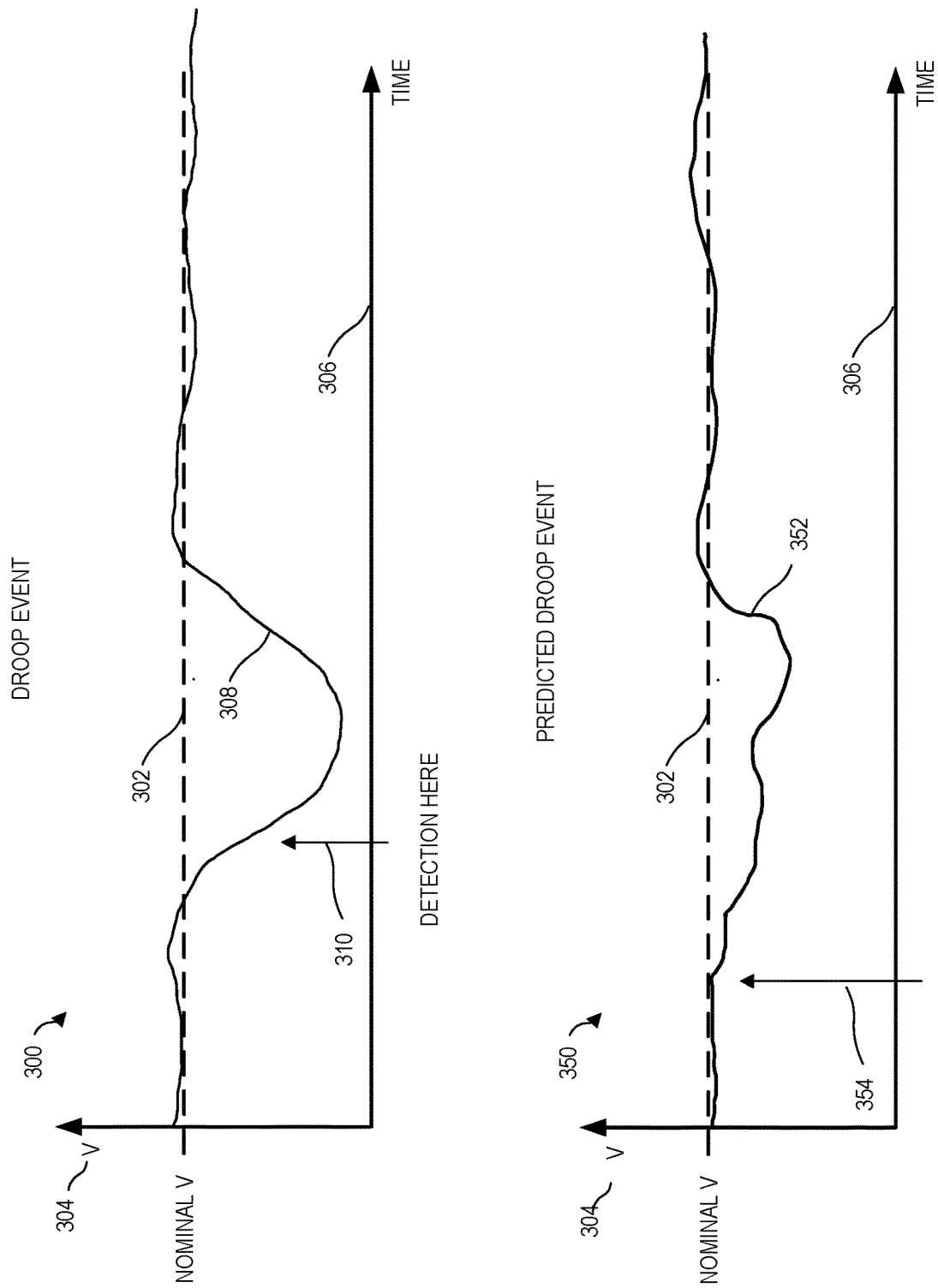
FIG. 3 is a diagram illustrating an example of predicting a voltage droop condition at a point on the processor of FIG. 1 to predict a droop event in accordance with some embodiments.

FIG. 3 is a diagram illustrating an example of predicting a voltage droop condition 300 at a point on the processor 102 of FIG. 1 to predict a droop event 300 in accordance with some embodiments. The droop event 300 is one example of a droop event, but other droop events are possible to include events with longer or shorter duration and magnitude. The droop event 300 is displayed on a graph with time on a horizontal axis 306 and voltage on a vertical axis 304. The graph also displays a 100% nominal voltage 302 reference line. The diagram also displays a waveform of a voltage droop 308, with the droop 308 having a reduction in voltage as applied to the processor 102 and an eventual return to nominal voltage 302. Also, the droop event 300 includes a region of the droop 308 where detection 310 occurs. Detection 310 of the droop 308 occurs when the voltage levels drop an appreciable level below the nominal voltage 302. As described with respect to FIG. 1, droop events create adverse effects to the operation of the processor 102 to include missed instructions and module malfunctions.

FIG. 3 also includes a graph of a predicted droop event 350 where the droop voltage is displayed in relation to the nominal voltage 302. In this embodiment, the monitoring system 140 of FIG. 1 has predicted the likelihood of a droop event 350, where the prediction 354 occurs at an earlier time than the detection 310 of the droop event 300, and before the droop event 352 has begun. In some embodiments, early prediction 354 of the likelihood of a droop event 352 mitigates the intensity and duration of the droop event 352 and precludes the droop event 352 from taking place. In comparing the droop event 300 with the predicted droop event 350, it is noteworthy that the prediction 354 of the droop event 352 occurs much earlier in time that the detection 310 of the droop event 300. In this manner, the actual droop event 352 is mitigated or minimized after the response policy chosen is executed by the monitoring system 140 of FIG. 1.

Figure 4:
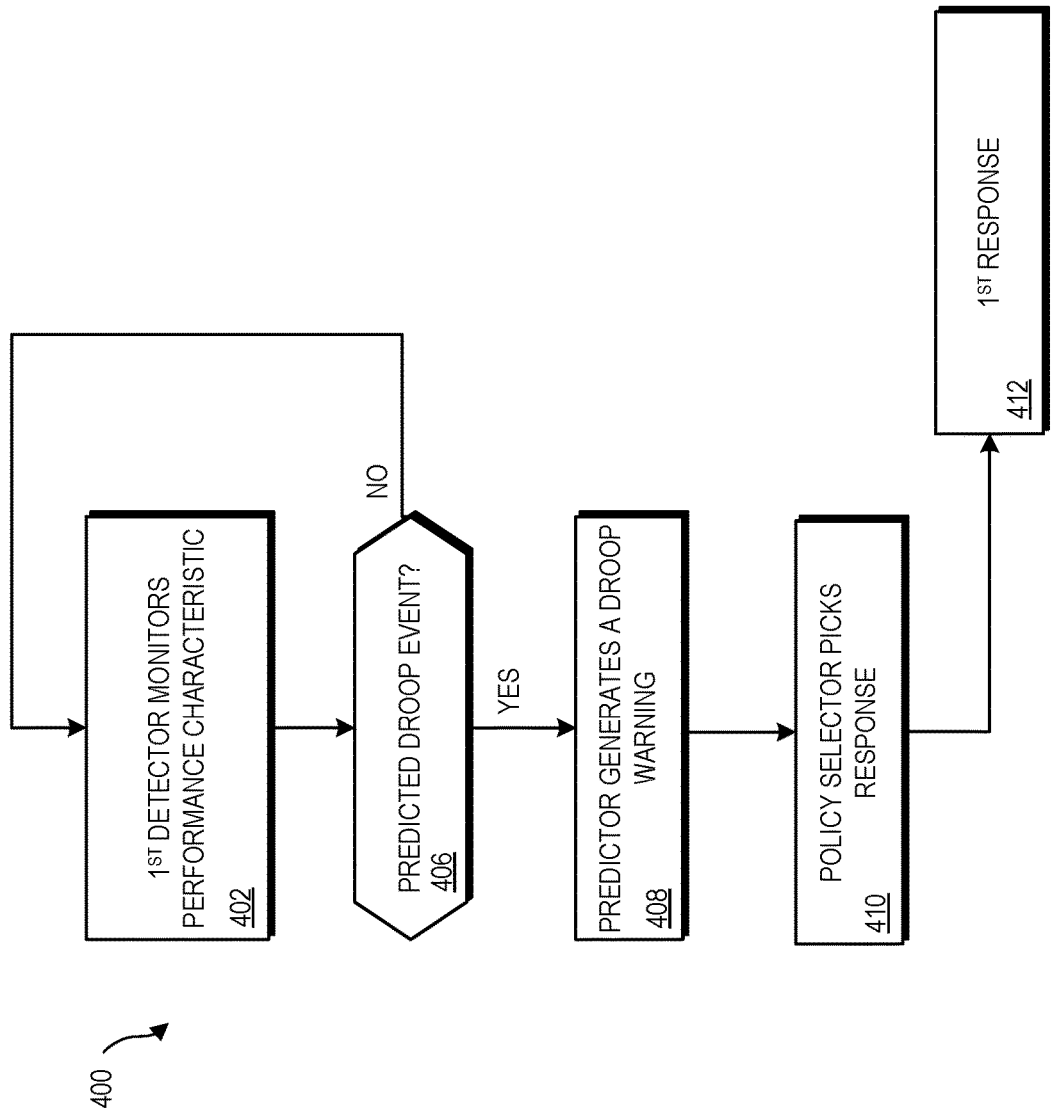
FIG. 4 is a flow diagram illustrating a method for predicting a droop event at a single point of a processor in accordance with some embodiments.

FIG. 4 is a flow diagram illustrating a method 400 for predicting a droop event at a single point of a processor 102 of FIG. 1 in accordance with some embodiments. The method 400 includes, at block 402, the first detector 130A of FIG. 1 detecting the performance characteristic 132 of the processor 102 as described in FIG. 2. The first detector 130A sends the performance data to the monitoring module 142. The performance characteristic 132 of the processor 102 includes, but is not limited to, the cache hit rate of the first core 104, the voltage level at the first core 104, the number of instructions executed by the first core 104 over a time interval, and the like. In some embodiments, the monitoring of other performance characteristics 132 are possible and are not limited herein. Next, at decision block 406, the predictor module 144 determines whether the history of performance characteristics 132 warrants a predicted droop warning to be generated. If the answer is "NO", the method 400 returns to block 402 for another cycle of monitoring. If the answer is "YES", the method 400 continues to block 408, where the predictor module 144 generates a droop warning for the modules of processor 102. Next, at block 410, the droop warning is sent to the policy selector module 146, where a first response policy 210 of FIG. 2 is chosen and sent out to the processor 102 at block 412. The first response policy 210 creates actions that include, but is not limited to, sending commands to the reference clocks 116, 118 to begin clock stretching, reducing read/write instructions by the processor 102, or slowing the execution of instructions by the processor 102 without also slowing the clocks 116, 118. In some embodiments, multiple actions are taken based on a single first response policy 210.

Figure 5:
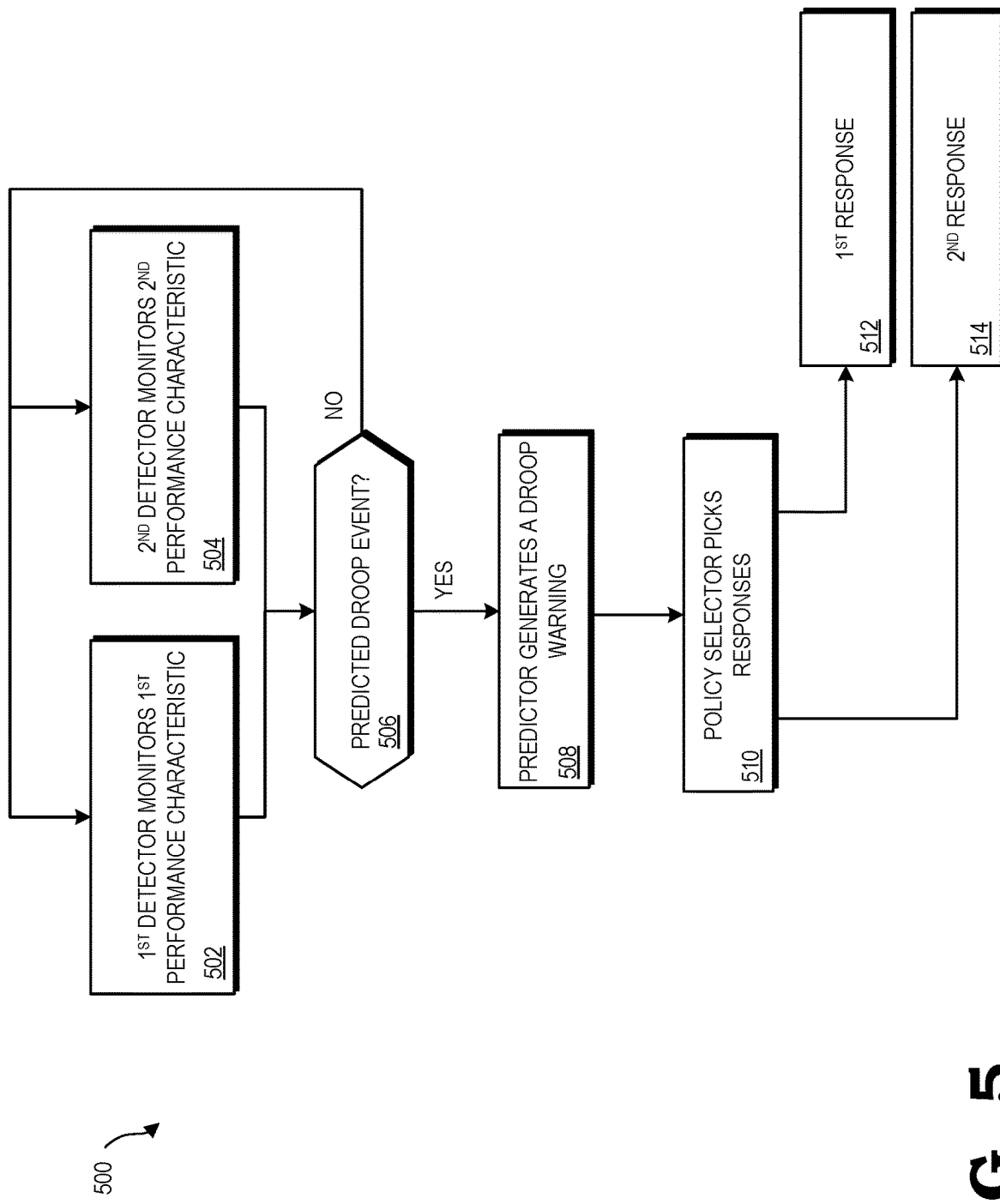
FIG. 5 is a flow diagram illustrating a method for predicting a droop event by monitoring multiple performance characteristics of a processor in accordance with some embodiments.

FIG. 5 is a flow diagram illustrating a method 500 for predicting a droop event by monitoring multiple performance characteristics 132 of a processor 102 of FIG. 1 in accordance with some embodiments. The method 500 is similar to the method 400 described in FIG. 4, but with additional performance characteristics 132 being monitored, and with multiple response policies 210, 212 being generated by the monitoring system 140. In the present embodiment, the first and second response policies 210, 212 are applied to the same or different modules of the processor 102. In one embodiment, the first response policy 210 is directed towards modules associated with the first core 104 of FIG. 1 such as the clock 116 and dedicated memory. In addition, the second response policy 212 is directed to modules of the second core 106 including the clock 118 and any memory for exclusive use by the second core 106.

The method 500 includes, at block 502, the first detector 130A of FIG. 1 detecting the performance characteristic 132 of the processor 102 as described in FIG. 2. The first detector 130A sends the performance characteristics 132 to the monitoring module 142. At the same time, at block 504, the second detector 130B of FIG. 1 detects the same or different performance characteristics 132 of the processor 102 as described in FIG. 2. The performance characteristics 132 of the processor 102 include, but is not limited to, the cache hit rate of the first core 104, the voltage level at the second core 106, the number of instructions executed by the first and second cores 104, 106 over a time interval, and the like. In some embodiments, the monitoring of other performance characteristics 132 are possible and are not limited herein. Next, at decision block 506, the predictor module 144 determines whether the history of performance characteristics 132 warrants a predicted droop warning to be generated. If the answer is "NO", the method 500 returns to blocks 502 and 504 for another cycle of monitoring. If the answer is "YES", the method 500 continues to block 508, where the predictor module 144 generates a droop warning for the various modules of processor 102. Next, at block 510, the droop warning is sent to the policy selector module 146, where a first response policy 210 and a second response policy 212 of FIG. 2 are chosen and sent out to the processor 102 at blocks 512 and 514, respectfully. The first response policy 210 and second response policy 212 create actions that include, but is not limited to, sending commands to the reference clocks 1116, 118 to begin clock stretching, reducing read/write instructions by the processor 102, or slowing the execution of instructions by the processor 102 without also slowing the reference clocks 116, 118. In some embodiments, multiple actions are taken based on a single first and second response policy 210, 212 respectively.

A computer readable storage medium may include any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory) or coupled to the computer system via a wired or wireless network (e.g., network accessible storage (NAS)).

In some embodiments, certain aspects of the techniques described above may implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
monitoring, by a first detector, a first performance characteristic of a processor;
predicting a first voltage droop condition based on the monitored first performance characteristic;
selecting a first response policy for the processor based on predicting the first voltage droop condition; and
adjusting a first parameter of the processor based on the first response policy, wherein the first parameter comprises a rate of executing instructions while maintaining a first clock frequency.

2. The method of claim 1, adjusting a second parameter, wherein the second parameter comprises a frequency of a first clock signal.

3. The method of claim 1, adjusting a second parameter, wherein the second parameter comprises a number of operations the processor is executing per clock cycle.

4. A method comprising:
monitoring a plurality of performance characteristics at a processor;
predicting a plurality of voltage droop conditions based on the monitored plurality of performance characteristics;
in response to predicting a first droop condition, selecting one of a plurality of response policies; and
adjusting one or more parameters of the processor based on the selected one of the plurality of response policies, wherein the one or more parameters comprises a rate of executing instructions at the processor while maintaining a first clock frequency.

5. The method of claim 4, wherein the plurality of performance characteristics comprises a cache hit rate.

6. The method of claim 4, wherein the plurality of performance characteristics comprises an instruction pointer value.

7. The method of claim 4, wherein the one or more parameters comprises a number of operations the processor is executing per clock cycle.

8. The method of claim 4, wherein the one or more parameters comprises a frequency of a first clock signal of the processor and a frequency of a second clock signal of the processor.

9. The method of claim 8, wherein adjusting the one or more parameters comprises adjusting the frequency of the first clock signal by a magnitude different than adjusting the frequency of the second clock signal.

10. A processor comprising:
a monitoring system comprising a first detector, wherein the first detector monitors a first performance characteristic of the processor;
a predictor system configured to predict a voltage droop condition based on the monitored first performance characteristic; and
a policy selector system configured to select and implement a first response policy in response to the predictor system predicting the voltage droop condition, wherein the first response policy comprises a policy to adjust a first parameter, the first parameter comprises a rate of executing instructions while maintaining a first clock frequency.

11. The processor of claim 10, wherein the first response policy comprises a policy to adjust a frequency of a first clock signal by a clock control module.

12. The processor of claim 10, wherein the first response policy comprises a policy to adjust a number of operations the processor is executing per clock cycle.

13. The processor of claim 10, wherein the policy selector system is configured to select and implement a second response policy in response to predicting the voltage droop condition, wherein the first response policy and the second response policy are different.

14. The processor of claim 10, wherein:
the monitoring system comprises a second detector, wherein the second detector monitors a second performance characteristic of the processor.

15. The processor of claim 14, wherein the first performance characteristic is different than the second performance characteristic.

16. The processor of claim 14, wherein the predictor system is configured to predict a voltage droop condition based on the monitored second performance characteristic.

17. The processor of claim 14, further wherein: the policy selector system is configured to select a second response policy based on predicting the voltage droop condition, wherein the second response policy is different than the first response policy.

* * * * *